United States Patent
Do et al.

(10) Patent No.: US 9,534,847 B2
(45) Date of Patent: Jan. 3, 2017

(54) FIRING CONTAINERS

(71) Applicant: SAMSUNG SDI CO., LTD., Yongin-si, Gyeonggi-do (KR)

(72) Inventors: Young-Hoon Do, Yongin-si (KR); Myung-Hun Bae, Yongin-si (KR); Suk-Chul Jung, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 653 days.

(21) Appl. No.: 13/829,666

(22) Filed: Mar. 14, 2013

(65) Prior Publication Data

US 2013/0280667 A1 Oct. 24, 2013

(30) Foreign Application Priority Data

Apr. 18, 2012 (KR) ........................ 10-2012-0040311

(51) Int. Cl.
 *F27B 14/10* (2006.01)
 *F27D 5/00* (2006.01)

(52) U.S. Cl.
 CPC .................................. *F27D 5/0068* (2013.01)

(58) Field of Classification Search
 CPC ............ C21D 9/0025; F27D 5/00; F27D 3/12; F27D 5/0012; B65D 7/14
 USPC ......... 432/258, 261; 269/291; 220/669, 672, 220/674
 See application file for complete search history.

(56) References Cited

U.S. PATENT DOCUMENTS

| | | | | | |
|---|---|---|---|---|---|
| 1,384,468 A | * | 7/1921 | Howell | ................ | F27D 5/0018 432/241 |
| 1,566,070 A | * | 12/1925 | Buckley | ................ | F27D 5/0012 432/258 |
| 2,369,756 A | * | 2/1945 | Sackerson | ............ | C21D 9/0006 432/261 |
| 2,738,564 A | * | 3/1956 | Guinane | ................ | F26B 25/18 206/322 |
| 3,877,869 A | * | 4/1975 | Palazzo | ................ | F27D 5/0012 432/258 |
| 3,988,107 A | * | 10/1976 | Koch | .................... | F27D 5/0012 432/253 |
| 4,008,997 A | * | 2/1977 | Krasl | .................... | F27D 5/0012 165/9.1 |

(Continued)

FOREIGN PATENT DOCUMENTS

| | | |
|---|---|---|
| JP | 2003201182 A | 7/2003 |
| KR | 1020090078952 | 7/2009 |

(Continued)

OTHER PUBLICATIONS

Korean Office Action issued on Jan. 21, 2014 in connection with Korean Patent Application Serial No. 10-2012-0040311 which is the priority document to the present application and Request for Entry of the Accompanying Office Action attached herewith.

(Continued)

*Primary Examiner* — Gregory A Wilson
(74) *Attorney, Agent, or Firm* — Robert E. Bushnell, Esq.

(57) ABSTRACT

Firing containers for firing an electrode active material include one or more through openings, and protrusions protruding from an outer surface of sidewalls of each of the firing containers. The protrusions allow adjacent firing containers to be spaced apart from each other and guide the adjacent firing containers during alignment.

19 Claims, 6 Drawing Sheets

(56) References Cited

U.S. PATENT DOCUMENTS

| | | | |
|---|---|---|---|
| 5,752,821 A * | 5/1998 | Jo .............................. | F27D 5/00 |
| | | | 269/54.5 |
| 5,935,665 A * | 8/1999 | Biek ......................... | B28B 1/14 |
| | | | 428/34.4 |
| 8,708,295 B2 * | 4/2014 | Barthelmie .......... | C21D 9/0025 |
| | | | 248/346.02 |
| 2011/0031105 A1 | 2/2011 | Miyanaga | |
| 2012/0074624 A1 * | 3/2012 | Wood .................... | F27D 5/0006 |
| | | | 266/274 |
| 2014/0178827 A1 * | 6/2014 | Na ........................ | F27D 5/0068 |
| | | | 432/261 |

FOREIGN PATENT DOCUMENTS

| | | |
|---|---|---|
| KR | 1020110015371 | 2/2011 |
| KR | 101177545 B1 | 8/2012 |

OTHER PUBLICATIONS

Korean Notice of Allowance issued on May 20, 2014 in connection with Korean Patent Application Serial No. 10-2012-0040311 which is the priority document to the present application and Request for Entry of the Accompanying Office Action attached herewith.

* cited by examiner

FIRING CONTAINERS

CLAIM OF PRIORITY

This application claims priority to and the benefit of Korean Patent Application No. 10-2012-0040311, filed on Apr. 18, 2012, in the Korean Intellectual Property Office, the entire content of which is incorporated herein by reference.

BACKGROUND OF THE INVENTION

Field of the Invention

An aspect of the present invention relates to firing containers, and more particularly, to firing containers capable of efficiently firing a large amount of an electrode active material.

Description of the Related Art

Firing containers can be used in various fields. Among the various fields, the firing containers are used in firing of an electrode active material used in secondary batteries.

In general, the electrode active material is a major factor that influences the reliability and safety of secondary batteries in the charging/discharging of the secondary batteries. In producing an electrode, the electrode active material is modified to be suitable for the secondary batteries through a firing process. However, when a problem occurs in the firing process, the resultant electrode active material may have bad influence on the reliability and safety of the secondary batteries. Particularly in case of safety, the electrode active material may cause fire, an explosion or the like when the secondary batteries are used.

SUMMARY OF THE INVENTION

Embodiments provide firing containers having a new structure.

Embodiments also provide firing containers capable of efficiently firing an electrode active material used in a secondary battery.

According to an aspect of the present invention, there is provided a firing container arrangement including a plurality of firing containers to fire an electrode active material, including at least one through opening and a plurality of protrusions protruding from outer sidewall surfaces of each of the firing containers, wherein the protrusions space-apart adjacent firing containers from each other while guide in alignment of the adjacent firing containers. The protrusions may be provided at positions that correspond to each other in the adjacent firing containers. Each firing container may include a hexahedron having an opened first surface. Portions of each firing container where adjoining sidewalls meet may be rounded. Each protrusion may be arranged in a vicinity of a corner portion of a sidewall of a firing container. The protrusions may be respectively arranged in a vicinity of each corner of an outer sidewall surface of each sidewall of each firing container. Each protrusion may extend vertically from a top edge to a bottom edge of each sidewall and in a vicinity of side edges of each sidewall of each firing container. A protruding length of each protrusion may be about 3 to 15 mm. Each protrusion may have a cross-sectional shape selected from a group consisting of circular and polygonal.

A first surface of each firing container may be opened, and the through opening may be connected to the opened first surface. Each firing container may be a hexahedron of which the first surface is opened, and each protrusion may be arranged on outer sidewall surfaces of each firing container and provided between the through opening and the corner. Each firing container may be a hexahedron of which first surface is opened, and each protrusion may be arranged on outer sidewall surfaces of each firing container while extending parallel and adjacent to a bottom edge of each sidewall surface of each firing container between the through opening and the bottom side.

The firing container arrangement may also include a plurality of first firing container groups, each including one or more of the firing containers and being aligned in one direction and a plurality of second firing container groups, each including one or more of the firing containers and also being aligned in the one direction while extending in parallel with respect to the first firing container groups, wherein the first and second firing container groups are spaced-apart from each other by the protrusions opposite to each other. The first and second firing container groups may be stacked in a plurality of layers. The firing containers may be adapted to fire a positive electrode active material onto a collector plate for a secondary battery.

According to another aspect of the present invention, there is provided a firing container arrangement including a plurality of firing containers, each firing container being a hexahedron that includes an open first surface, a plurality of sidewalls extending between the open first surface and a bottom surface opposite the open first surface, each sidewall including a top edge adjacent to the open first surface, a bottom edge adjacent to the bottom surface, and side edges connecting adjoining ones of the side surfaces and a plurality of protrusions extending from an outer surface of the sidewalls to space-apart adjoining firing containers. Each of the protrusions may be arranged at locations on the sidewalls of a firing container that correspond to locations of protrusions extending from an adjacent firing container. Each of the protrusions may extend from a top edge to a bottom edge of a sidewall outer surface.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
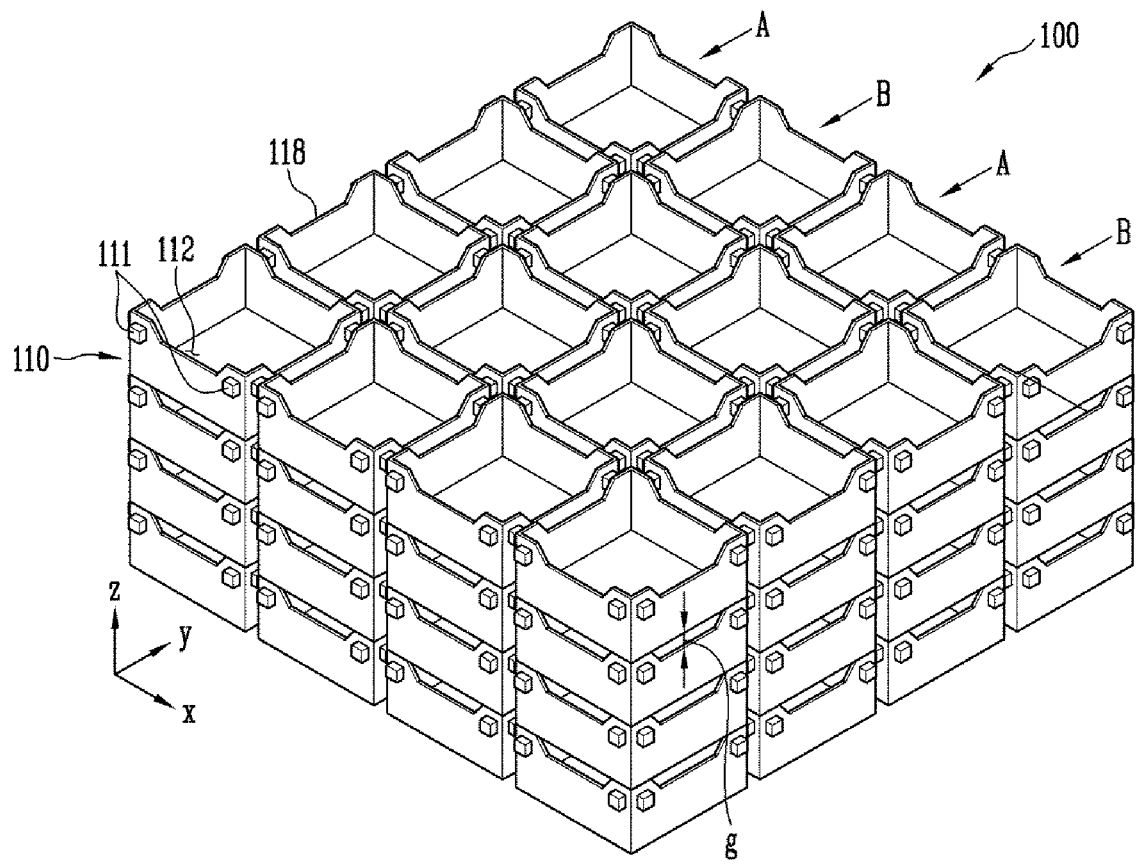
FIG. 1 is a perspective view showing a firing container arrangement in which a plurality of firing containers are aligned according to a first embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments of the present invention will be described with reference to the accompanying drawings.

Turning now to FIG. 1, FIG. 1 is a perspective view showing a firing container arrangement 100 in which a plurality of firing containers 110 according to a first embodiment of the present invention are aligned. Referring to FIG. 1, the firing containers 110 according to the first embodiment are used in firing of an electrode active material. The firing containers include one or more through openings 112, and protrusions 111 protruded from an outer surface of sidewalls 115 of each of the firing containers. The protrusions 111 allows adjacent firing containers 110 to be spaced apart from each other and to guide in the alignment of adjacent firing containers 110. In the arrangement 100 in which the plurality of firing containers 110 are aligned, the protrusions 111 may be provided at positions opposite to each other in the adjacent firing containers 110.

Figure 2:
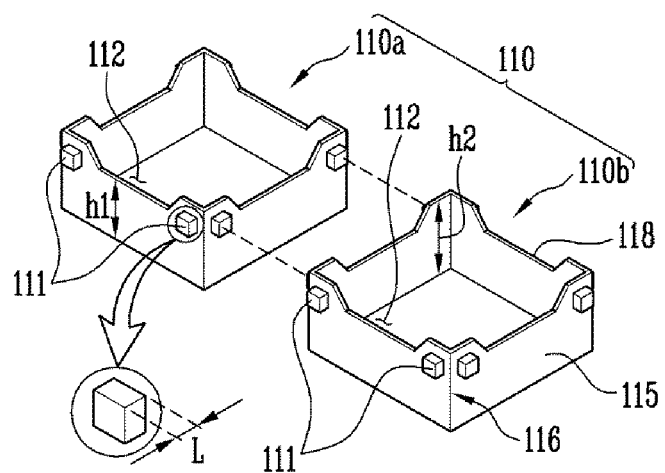
FIG. 2 is a perspective view showing adjacent firing containers according to the first embodiment of the present invention.

Turning now to FIG. 2, FIG. 2 is a perspective view showing adjacent firing containers according to the first embodiment of the present invention. Referring to FIG. 2, the firing container 110 may be provided so that a first surface of the firing container 110 is opened, and the through opening 112 may be connected to the opened first surface. For example, the firing container 110 is a hexahedron of which first surface is opened, and protrusions 111 is provided on an outer surface of sidewalls 115 of each firing container 110. The protrusions 111 may be provided at corners of each outer sidewall surfaces of each firing container 110. Preferably, the firing container 110 includes a hexahedron of which first surface is opened, and the protrusion 111 may be provided on the outer surface sidewalls 115 of each firing container 110.

Each sidewall 115 may include gas inlet portions 118 where the height of the sidewall is h1 is less than a height of the sidewall h2 of corner portions. When firing containers are stacked on top of each other as in FIGS. 1 and 3B, reaction gases may enter the firing containers through gaps g between a top edge of the sidewalls 115 at locations corresponding to the gas inlet portion 118 of a first layer and a bottom of the firing container arranged on a second layer on top of the first layer, where gap g is equal to the difference in heights h2–h1 of the sidewalls 115. Preferably, the gas inlet portions 118 are arranged at locations of the sidewalls 115 that do not correspond to the protrusions 111, so that the protrusions 111 do not interfere with reactant gases entering each firing container and exhaust gases that exit each firing container through the gaps g during the firing process.

A secondary battery includes an electrode assembly and an electrolyte in the inside thereof. Here, the electrode assembly is composed of a positive electrode plate, a negative electrode plate and a separator interposed between the electrode plates. The positive and negative electrode plates generate electric energy by electrochemically reacting with the electrolyte. The positive and negative electrode plates are manufactured by coating a positive or negative electrode active material on a current collector or base material such as copper or aluminum foil. The electrode active material including the positive and negative electrode active materials is a factor that has great influence on the reliability and safety of the secondary battery, including the capacity of the secondary battery. Therefore, the degree of purity of the electrode active material and whether or not the electrode active material reaches a target state become a major control factor in the reliability, safety and capacity of a secondary battery. Particularly, since the positive electrode active material is made of a compound including lithium, the electrode active material is further problematic. The lithium having very high reactivity becomes a cause of explosion or fire, thereby presenting an industrial hazard. Since lithium easily deteriorates by reacting with moisture existing at a normal temperature, a situation frequently occurs in which properties of the electrode active material are unequally implemented in one arrangement.

The present invention relates to firing containers used in firing of an electrode active material used in a secondary battery so as to be suitable for the secondary battery. The firing containers can facilitate mass-production of the electrode active material and can easily control the electrode active material. Further, since it is possible to prevent explosion or a fire that may occur in the processing of the electrode active material, it is possible to provide firing containers capable of improving not only process efficiency but also safety in the manufacture of the secondary battery. When the electrode active material is produced using the firing containers according to the present invention, the characteristics of the electrode active material can be uniformly maintained, and thus characteristics of the secondary battery using the electrode active material in one arrangement can also be equally maintained. For example, the firing containers 110 may be used in firing of a positive electrode active material for a secondary battery.

Referring to the firing container arrangement 100 in which the plurality of firing containers 110 are aligned, the protrusions 111 protruding from an outer sidewall surface of the firing container 110 allows adjacent firing containers 110a and 110b to be spaced apart from each other. In this case, the protrusions 111 may be located adjacent to a corner of the firing container 110 at corners of the sidewalls 115. Furthermore, the protrusions 111 in the adjacent firing containers 110a and 110b are arranged at locations opposite to each other. The protrusions 111 may be, respectively, provided at locations corresponding to corners of the through openings 112 of the firing container 110. In this case, the protruding length L of the protrusion 111 may be about 3 to 15 mm.

When the protruding length L of the protrusion 111 is less than 3 mm, the space between the adjacent firing containers becomes too narrow, which is problematic. That is, the inflow of reactant gas used in the firing of the electrode active material provided in the firing containers and the outflow of gas produced during the firing of the electrode active material is not smoothly performed, and therefore, the firing of the electrode active material is not uniformly achieved. In a serious case, the gases fail to flow to the innermost firing containers, and therefore, the firing of the electrode active material may not occur. When the protruding length L of the protrusion 111 exceeds 15 mm, inflow of reactant gas and the outflow of exhaust gas is not restricted, however the space between the adjacent firing containers becomes unnecessarily large, and therefore, the firing container arrangement in which the plurality of firing containers are aligned becomes too bulky. As a result, the firing of a large amount of the electrode active material cannot be performed, production efficiency is lowered. Since a large amount of gas is used to equally maintain the pressure of the gas in the firing containers for firing the electrode active material, processing cost is increased.

Figure 3A:
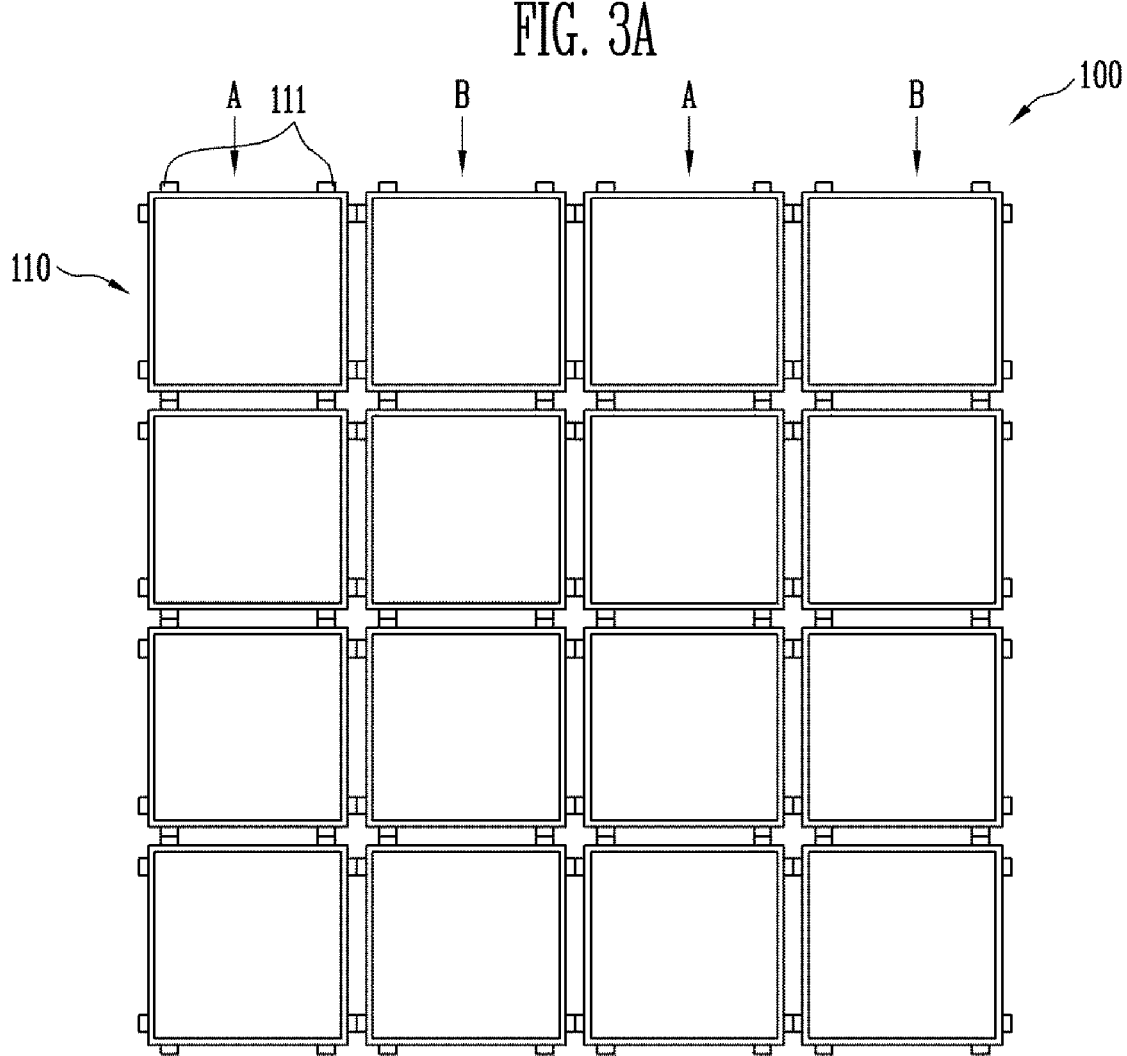
FIG. 3A is a top view showing the configuration in which the firing containers of the firing container arrangement of FIG. 1 are aligned.
Figure 3B:
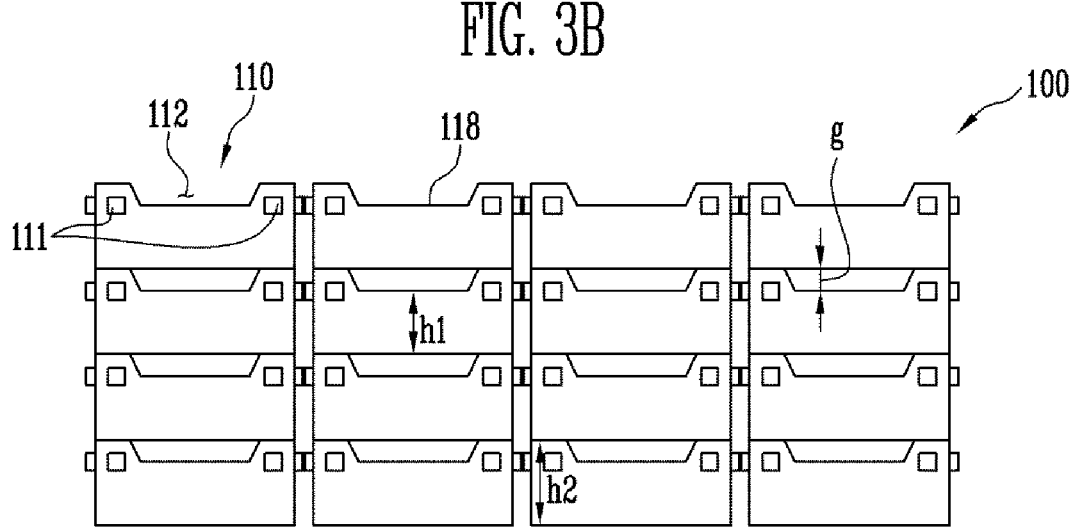
FIG. 3B is a front view showing the configuration in which the firing containers of the firing container arrangement of FIG. 1 are aligned.

Turning now to FIGS. 3A and 3B, FIG. 3A is a top view of the firing container arrangement 100 of FIG. 1 and FIG. 3B is a front view of the firing container arrangement 100 in which the firing containers 110 of FIG. 1 are aligned. Referring to FIGS. 3A and 3B, the firing containers 110 may include first firing container groups A each having one or more firing containers 110 arranged in one direction, and second firing container groups B each having one or more firing containers 110 arranged in the one direction and aligned in parallel with the first firing container groups A. The first and second firing container group A and B may be spaced-apart from each other by the protrusions 111. The first or second firing container groups A and B may also be stacked to form a plurality of layers.

The reaction formula of firing of the electrode active material used in the secondary battery is as follows: X (reactant 1)+Y (reactant 2)+oxygen (gas 1)→A (product)+ carbon dioxide (gas 2). The firing of the electrode active material of the secondary battery is performed according to the reaction formula described above. The firing of the electrode active material may be performed using a roller hearth kiln (RHK). In this case, general firing containers are not stacked but aligned in one layer. When the firing containers are stacked, gases 1 and 2 used or exhausted in the firing of the electrode active material are not smoothly flowed, and therefore, the firing process is problematic. A plurality of firing containers having a predetermined volume is used to equally perform firing of the electrode active material. In this case, much time is taken to align spaces between the firing containers, and therefore, the process efficiency is deteriorated.

Referring to the configuration 100 in which the plurality of firing containers 110 are aligned, the through opening 112 is provided in the firing container 110. Thus, even when the first and second firing container groups A and B are stacked in a plurality layers, the gas 1 such as oxygen can smoothly flow into the firing containers 110 through the through openings 112. The gas 2 such as carbon dioxide generated during the firing of the electrode active material can also flow smoothly and be exhausted through the through openings 112, and thus it is possible to easily perform firing of the electrode active material. Since the firing containers 110 are spaced-apart from one another at a predetermined interval by the protrusions 111, the movement of the gases 1 and 2 is more smoothly performed, so that it is possible to efficiently perform the firing of a large amount of the electrode active material.

Hereinafter, other embodiments of the present invention will be described with reference to FIGS. 4A to 9B. Contents of these embodiments, except the following contents, are similar to those of the first embodiment described with reference to FIGS. 1 to 3B, and therefore, their detailed descriptions will be omitted.

Figure 4A:
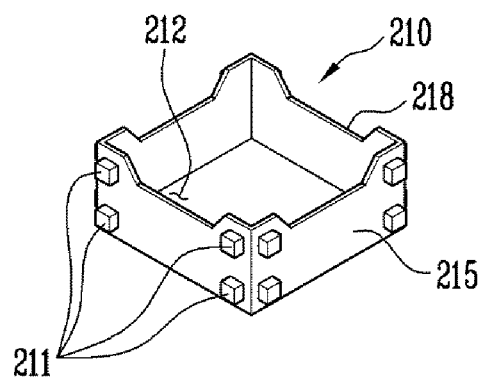
FIG. 4A is a perspective view of a firing container according to a second embodiment of the present invention.
Figure 4B:
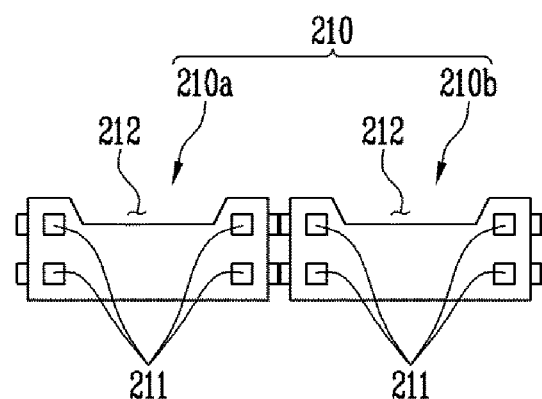
FIG. 4B is a front view showing adjacent firing containers according to the second embodiment of the present invention.

Turning now to FIGS. 4A and 4B, FIG. 4A is a perspective view of a firing container according to a second embodiment of the present invention and FIG. 4B is a front view showing adjacent firing containers according to the second embodiment of the present invention. Referring to FIGS. 4A and 4B, the firing containers 210 according to the second embodiment include through openings 212 and protrusions 211 protruded from outer sidewall surfaces of each firing containers 210. The protrusions 211 allow adjacent firing containers 210a and 210b to be spaced apart from each other. As illustrated in FIGS. 4A and 4B, the protrusions 211 may be provided at positions opposite to each other in the firing containers 210a and 210b. The firing container 210 includes a hexahedron of which a first surface is opened, and the protrusions 211 are provided on outer sidewall surfaces of the firing container 210.

In the second embodiment of FIGS. 4A and 4B, the protrusions 211 may be, respectively, provided to all corners of each sidewall surface of each firing container 210. As with the first embodiment, portions of the sidewalls 215 away from the corners and away from the protrusions 211 have a shorter height that other portions and are thus characterized as gas inlet portions 218 that allow reactant gases to easily flow into the firing containers and exhaust gases to easily flow out of the firing containers to facilitate the reaction within the firing containers, even when the firing containers are stacked on top of one another. That is, the protrusions 211 are, respectively, provided at all four corners on each quadrangular side surface. Thus, although the adjacent firing containers 210a and 210b are aligned with an unequal force, a problem such as a misalignment of the firing containers 210 does not occur, so that the firing containers 210 can be easily aligned. Accordingly, even when the firing containers 210 have a predetermined size or more, the protrusions 211 can easily guide the alignment of the plurality of firing containers 210.

Figure 5:
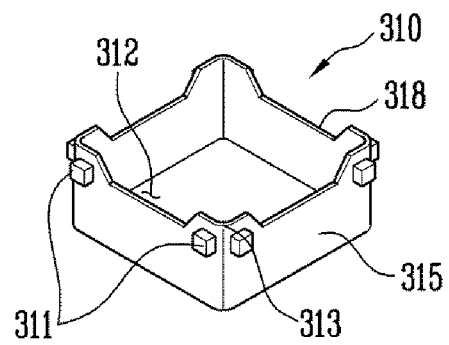
FIG. 5 is a perspective view of a firing container according to a third embodiment of the present invention.
Figure 6:
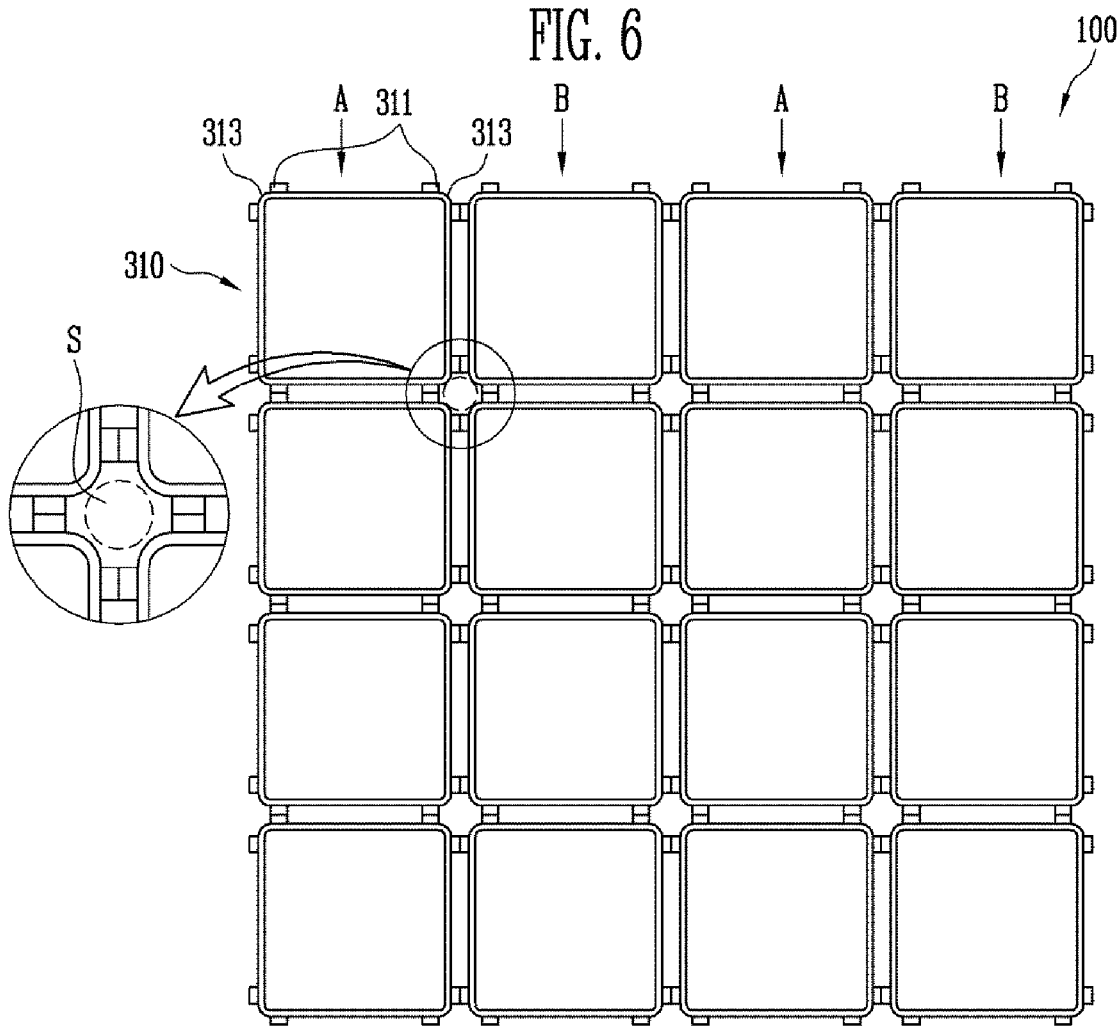
FIG. 6 is a top view showing a firing container arrangement in which firing containers are aligned according to the third embodiment of the present invention.

Turning now to FIGS. 5 and 6, FIG. 5 is a perspective view of a firing container according to a third embodiment of the present invention and FIG. 6 is a top view showing a firing container arrangement in which firing containers of FIG. 5 are arranged. Referring to FIGS. 5 and 6, the firing containers 310 according to the third embodiment include first and second firing container groups A and B, each having one or more firing containers 310 aligned in one direction while being spaced apart from one another by protrusions 311. As with the first two embodiments, portions of the sidewalls 315 away from the corners and away from the protrusions 311 have a shorter height that other portions and are thus characterized as gas inlet portions 318 that allow reactant gases to easily flow into the firing containers and exhaust gases to easily flow out of the firing containers to facilitate the reaction within the firing containers, even when the firing containers are stacked on top of one another. In this third embodiment, corners 313 of the firing container 310 may be rounded. Since the corners 313 of the firing container 310 are rounded, a space S provided at the intersection of four firing containers may be further broadened. Thus, since the inflow and exhaustion of gases are further activated through the firing containers 310, the number of firing containers 310 is not limited, so that it is possible to easily perform firing of a large amount of electrode active material.

Figure 7:
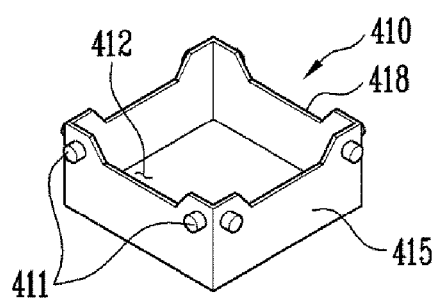
FIG. 7 is a perspective view of a firing container according to a fourth embodiment of the present invention.

Turning now to FIG. 7, FIG. 7 is a perspective view of a firing container according to a fourth embodiment of the present invention. Referring now to FIG. 7, the firing container 410 according to the fourth embodiment may have a through opening 412 and protrusions 411, and the protrusion 411 may have a circular or polygonal section. As with the first three embodiments, portions of the sidewalls 415 away from the corners and away from the protrusions 411 have a shorter height that other portions and are thus characterized as gas inlet portions 418 that allow reactant gases to easily flow into the firing containers and exhaust gases to easily flow out of the firing containers to facilitate the reaction within the firing containers, even when the firing containers are stacked on top of one another. The protrusions 411 of the firing container 410 are protruded from outer sidewall surfaces of the firing container 410 so as to allow the firing container 410 to be spaced apart from other firing containers adjacent to the firing container 410. In the fourth embodiment, the protrusion 411 may have various shapes, and hence the design of the firing container 410 can be diversified. Thus, the firing container 410 corresponding to each electrode active material can be distinctively used without adding a specific mark.

Figure 8A:
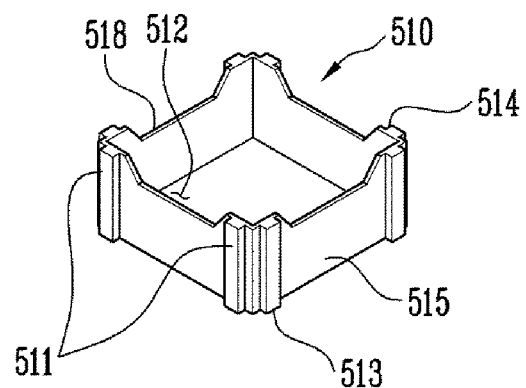
FIG. 8A is a perspective view of a firing container according to a fifth another embodiment of the present invention.
Figure 8B:
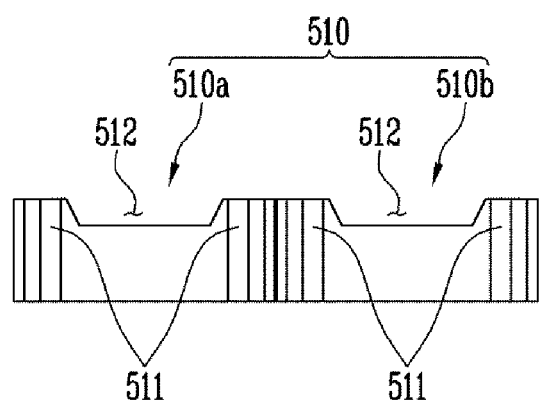
FIG. 8B is a front view showing adjacent firing containers according to the fifth embodiment of the present invention.

Turning now to FIGS. 8A and 8B, FIG. 8A is a perspective view of a firing container according to a fifth embodiment of the present invention and FIG. 8B is a front view showing adjacent firing containers according to the fifth embodiment of the present invention. As with the first four embodiments, portions of the sidewalls 515 away from the corners and away from the protrusions 511 have a shorter height that other portions and are thus characterized as gas inlet portions 518 that allow reactant gases to easily flow into the firing containers and exhaust gases to easily flow out of the firing containers to facilitate the reaction within the firing containers, even when the firing containers are stacked on top of one another. Referring now to FIGS. 8A and 8B, in the firing containers 510 according to the fifth embodiment, adjacent firing containers 510a and 510b are aligned so that protrusions 511 protruded on outer sidewall surfaces of the firing containers 510 that are opposite to each other. For example, the protrusion 511 may vertically extend from the top edge 514 of each sidewall to the bottom edge 513 at a location in the vicinity of the firing container 510. When the firing containers 510 are formed to be tall, there may be a problem in that the firing containers 510 are aligned with each other. That is, if upper sides of the adjacent firing containers 510a and 510b are aligned, lower sides of the adjacent firing containers 510a and 510b may not be aligned, and therefore, there may be a problem in that the alignment of the firing containers 510 is broken when the firing containers 510 are stacked. In the firing containers 510 according to the fifth embodiment, the protrusion 511 extends from the top to the bottom edge of each sidewall and along the corner of the firing container 510, and thus the firing containers 510 can be easily aligned regardless of the depth of the firing containers 510.

Figure 9A:
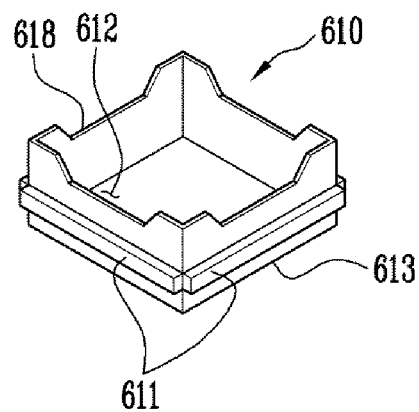
FIG. 9A is a perspective view of a firing container according to a sixth another embodiment of the present invention.
Figure 9B:
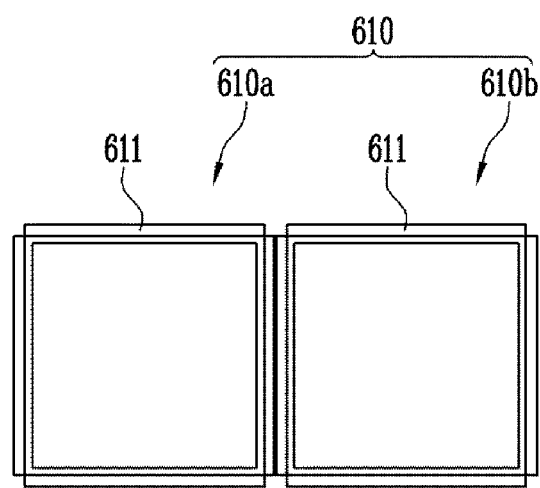
FIG. 9B is a plan view showing adjacent firing containers according to the sixth embodiment of the present invention.

Turning now to FIGS. 9A and 9B, FIG. 9A is a perspective view of a firing container according to a sixth embodiment of the present invention and FIG. 9B is a plan view showing adjacent firing containers according to the sixth embodiment of the present invention. Referring now to FIGS. 9A and 9B, each of the firing containers 610 according to the sixth embodiment may have a through opening 612 and protrusions 611. The firing container 610 is a hexahedron of which first surface is opened, and the through opening 612 may be connected to the opened first surface. The protrusions 611 are, respectively, provided on outer sidewall surfaces of the firing container 610. The protrusion 611 may be provided in parallel with a bottom edge 613 of each sidewall of each firing container 610. When the firing container 610 is formed to be tall (i.e. deep), there is a spatial limitation in forming the protrusion 611 in the longitudinal direction of the firing container 610 on an outer sidewall surface of the firing container 610, and therefore, the manufacturing cost of the firing containers 610 may be increased. On the other hand, the protrusion 611 according to the sixth embodiment is provided in parallel with the bottom edge 613 of the outer side of the sidewalls of the firing container 610. Thus, the protrusion 611 can be provided without the spatial limitation of the outer sidewall surface of the firing container 610.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A firing container arrangement including a plurality of firing containers to fire an electrode active material, comprising:
   at least one through opening;
   a plurality of sidewalls, each having outer surfaces opposite inner surfaces, wherein adjoining sidewalls meet at corner portions; and
   a plurality of protrusions protruding from the outer sidewall surfaces of the sidewalls of each of the firing containers, wherein the protrusions space-apart adjacent firing containers from each other while guide in alignment of the adjacent firing containers, wherein each of the sidewalls comprise a gas inlet portion arranged at a location that does not correspond to the protrusions, the gas inlet portion of each sidewall having a height that is less than that of other portions of the sidewall.

2. The firing container arrangement of claim 1, wherein the protrusions are provided at positions that correspond to each other in the adjacent firing containers.

3. The firing container arrangement of claim 1, wherein each firing container includes a hexahedron having an opened first surface.

4. The firing container arrangement of claim 3, wherein the corner portions of adjoining sidewalls are rounded.

5. The firing container arrangement of claim 1, wherein each protrusion is arranged in a vicinity of one of the corner portions, and each gas inlet portion is arranged about a central portion of each sidewall and away from the corner portions.

6. The firing container arrangement of claim 5, wherein the protrusions are respectively arranged in a vicinity of each corner portion of each firing container.

7. The firing container arrangement of claim 5, wherein each protrusion extends vertically from a top edge to a bottom edge of each sidewall and in a vicinity of side edges of each sidewall of each firing container.

8. The firing container arrangement of claim 1, wherein a protruding length of each protrusion is about 3 to 15 mm.

9. The firing container arrangement of claim 1, wherein each protrusion has a cross-sectional shape selected from a group consisting of circular and polygonal, each firing container comprises four sidewalls, each of the four sidewalls includes at least two protrusions.

10. The firing container arrangement of claim 1, wherein a first surface of each firing container is opened, and the through opening is connected to the opened first surface.

11. The firing container arrangement of claim 10, wherein each firing container is a hexahedron of which the first surface is opened, and each protrusion is arranged on the outer sidewall surfaces of each sidewall of each firing container and provided between the through opening and the corner.

12. The firing container arrangement of claim 10, wherein each firing container is a hexahedron of which first surface is opened, and each protrusion extends parallel and adjacent to a bottom edge of each sidewall surface of each firing container and at a location between the through opening and a bottom side.

13. The firing container arrangement of claim 1, further comprising:
a plurality of first firing container groups, each including one or more of the firing containers and being aligned in one direction; and
a plurality of second firing container groups, each including one or more of the firing containers and also being aligned in the one direction while extending in parallel with respect to the first firing container groups, wherein the first and second firing container groups are spaced-apart from each other by the protrusions opposite to each other.

14. The firing container arrangement of claim 13, wherein the first and second firing container groups are stacked in a plurality of layers, wherein a gap g is present between a top edge of sidewalls of a first layer of firing containers at locations corresponding to the gas inlet portions and a bottom of firing containers of a second layer arranged directly on top of the firing containers of the first layer, the gap having a size equal to a difference in height between portions of the sidewalls in a vicinity of the corner portions and portions of the sidewalls corresponding to the gas inlet portions, the gas inlet portions to allow reactant gases to enter the firing container during the firing and the allow exhaust gases to exit the firing container during the firing.

15. The firing container arrangement of claim 1, wherein the firing containers are adapted to fire a positive electrode active material onto a collector plate for a secondary battery.

16. A firing container arrangement including a plurality of firing containers, each firing container being a hexahedron comprising:
an open first surface;
a bottom surface;
a plurality of sidewalls extending between the open first surface and the bottom surface opposite the open first surface, each sidewall including a top edge adjacent to the open first surface, a bottom edge adjacent to the bottom surface, and side edges connecting adjoining ones of the side surfaces, the side edges of each sidewall corresponding to corner portions, wherein a height of each sidewall at a location corresponding to a gas inlet portion being less than a height of each sidewall external to the gas inlet portions; and
a plurality of protrusions extending from an outer surface of the sidewalls to space-apart adjoining firing containers.

17. The firing container arrangement of claim 16, wherein each of the protrusions are arranged at locations on the sidewalls of a firing container that correspond to locations of protrusions extending from an adjacent firing container and correspond to portions of the sidewalls external to the gas inlet portions.

18. The firing container arrangement of claim 16, wherein each of the protrusions extends from a top edge to a bottom edge of a sidewall outer surface.

19. The firing container arrangement of claim 16, wherein each of the protrusions extends from one side edge to an opposing side edge of a sidewall outer surface.

* * * * *